United States Patent
Gladkikh et al.

(10) Patent No.: US 10,255,322 B2
(45) Date of Patent: *Apr. 9, 2019

(54) UTILIZING PERSISTENT AND NON-PERSISTENT CONNECTIONS FOR DISTRIBUTED TASKS FOR PERFORMING A JOB

(71) Applicant: Splunk Inc., San Francisco, CA (US)

(72) Inventors: Denis Gladkikh, Redmond, WA (US); Mitchell Blank, Jr., San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,278

(22) Filed: Apr. 27, 2018

(65) Prior Publication Data

US 2018/0293112 A1    Oct. 11, 2018

Related U.S. Application Data

(63) Continuation of application No. 14/813,908, filed on Jul. 30, 2015, now Pat. No. 9,983,912, which is a
(Continued)

(51) Int. Cl.
*G06F 17/30* (2006.01)
*G06F 9/52* (2006.01)
(Continued)

(52) U.S. Cl.
CPC ...... *G06F 17/30442* (2013.01); *G06F 9/5011* (2013.01); *G06F 9/52* (2013.01);
(Continued)

(58) Field of Classification Search
CPC ......... G06F 17/30442; G06F 17/30424; G06F 17/30477; G06F 17/30554; G06F 17/30575

See application file for complete search history.

(56) References Cited

U.S. PATENT DOCUMENTS 5,652,789 A    7/1997  Miner et al.
6,970,913 B1   11/2005 Albert et al.
(Continued)

OTHER PUBLICATIONS

USPTO, Office Action for U.S. Appl. No. 14/813,908, dated Nov. 17, 2017.
(Continued)

*Primary Examiner* — Ramy M Osman
(74) *Attorney, Agent, or Firm* — Lowenstein Sandler LLP

(57) ABSTRACT

A method to assist with processing distributed jobs by retrieving and/or synchronizing supplemental job data. The method includes receiving a request to perform a job and opening a first connection (e.g., persistent connection) between a primary machine and a secondary machine, and transmitting by the primary machine a request pertaining to the job to the secondary machine using a second connection, the job to be performed by the secondary machine. The method also includes receiving by the primary machine using the second connection a task request for supplemental information pertaining to the job, transmitting by the primary machine a task response including the supplemental information to the secondary machine, and receiving a job result for the job using the second connection.

30 Claims, 16 Drawing Sheets

Related U.S. Application Data continuation of application No. 14/448,048, filed on Jul. 31, 2014, now Pat. No. 9,128,779.

(51) Int. Cl.
   *H04L 29/08* (2006.01)
   *G06F 9/50* (2006.01)
   *H04L 29/06* (2006.01)
   *H04L 12/24* (2006.01)

(52) U.S. Cl.
   CPC .. *G06F 17/30424* (2013.01); *G06F 17/30575* (2013.01); *H04L 41/0896* (2013.01); *H04L 65/608* (2013.01); *H04L 67/02* (2013.01)

(56) References Cited

U.S. PATENT DOCUMENTS

| | | | |
|---|---|---|---|
| 7,266,543 | B2 | 9/2007 | Evans et al. |
| 7,715,378 | B1 | 5/2010 | Daigle et al. |
| 8,051,213 | B2 | 11/2011 | Van Hensbergen et al. |
| 8,225,300 | B1 | 7/2012 | Webb et al. |
| 8,412,696 | B2 | 4/2013 | Zhang et al. |
| 8,539,542 | B1 | 9/2013 | Elhag et al. |
| 8,589,403 | B2 | 11/2013 | Marquardt et al. |
| 8,682,925 | B1 | 3/2014 | Marquardt et al. |
| 9,128,779 | B1 | 9/2015 | Gladkikh et al. |
| 9,983,912 | B2 | 5/2018 | Gladkikh et al. |
| 2003/0229702 | A1 | 12/2003 | Hensbergen et al. |
| 2004/0133691 | A1 | 7/2004 | Shimada |
| 2007/0150303 | A1 | 6/2007 | Cheenath |
| 2008/0163214 | A1 | 7/2008 | Rogers |
| 2011/0264849 | A1 | 10/2011 | Ware et al. |
| 2012/0173609 | A1 | 7/2012 | Kulaga et al. |
| 2012/0259961 | A1 | 10/2012 | Winokur |
| 2013/0086102 | A1 | 4/2013 | Addala et al. |
| 2013/0132967 | A1 | 5/2013 | Soundararajan et al. |
| 2013/0212638 | A1 | 8/2013 | Wilson |
| 2013/0262625 | A1 | 10/2013 | Watson et al. |
| 2013/0263136 | A1 | 10/2013 | Ohyama et al. |
| 2013/0290969 | A1 | 10/2013 | Branson et al. |
| 2013/0318236 | A1 | 11/2013 | Coates et al. |
| 2013/0318536 | A1 | 11/2013 | Fletcher et al. |
| 2013/0318603 | A1 | 11/2013 | Merza |
| 2013/0326620 | A1 | 12/2013 | Merza et al. |
| 2014/0025465 | A1 | 1/2014 | Herring et al. |
| 2014/0032743 | A1 | 1/2014 | Hiscock et al. |
| 2014/0160238 | A1 | 6/2014 | Yim et al. |
| 2014/0195871 | A1 | 7/2014 | Clayton et al. |
| 2014/0201759 | A1 | 7/2014 | Amikura |
| 2014/0313009 | A1 | 10/2014 | King et al. |
| 2016/0034319 | A1 | 2/2016 | Gladkikh et al. |
| 2017/0057083 | A1 | 3/2017 | Maeda |
| 2018/0293112 | A1* | 10/2018 | Gladkikh .......... G06F 17/30442 |

OTHER PUBLICATIONS

USPTO, Notice of Allowance for U.S. Appl. No. 14/813,908, dated Mar. 1, 2018.
USPTO, Office Action for U.S. Appl. No. 14/448,048, dated Jan. 5, 2015.
USPTO, Notice of Allowance for U.S. Appl. No. 14/448,048, dated May 7, 2015.
Bitincka, Ledion, et al., "Optimizing Data Analysis with a Semi-Structured Time Series Database", Splunk Inc., 2010 pp. 1-9.
Carasso, David, "Exploring Splunk Search Processing Language (SPL) Primer and Cookbook", Splunk Inc., 2012 , CITO Research, New York, 154 Pages.
http://docs.splunk.com/Documentation/PCI/2.1.1/ [000119] User/IncidentReviewdashboard, 2 Pages, (Last accessed Aug. 5, 2014).
"vSphere Monitoring and Performance", VMware, Inc., Update 1, vSphere 5.5, EN-001357-02, 2010-2014, pp. 1-174 http://pubs.vmware.com/ vsphere-55/topic/com.vmware.ICbase/PDF/ vsphere-esxi-vcenter-server-551-monitoring-performance-guide.pdf.
U.S. Appl. No. 14/167,316, filed Jan. 29, 2014.
U.S. Appl. No. 14/266,812, filed Apr. 30, 2014.
U.S. Appl. No. 14/266,817, filed Apr. 30, 2014.

* cited by examiner

Original Search: 501
search "error | stats count BY host

Sent to peers: 502
search "error | prestats count BY host (map)

Executed by search head: 503
Merge prestats results received from peers (reduce)

FIG. 8

| Data Summary | | | |
|---|---|---|---|
| Hosts (5) | Sources (8) | Sourcetypes (3) | |
| Host | | Count | Last Update |
| mailsv | | 9,829 | 4/29/14 1:32:47.000 PM |
| vendor_sales | | 30,244 | 4/29/14 1:32:46.000 PM |
| www1 | | 24,221 | 4/29/14 1:32:44.000 PM |
| www2 | | 22,595 | 4/29/14 1:32:47.000 PM |
| www3 | | 22,975 | 4/29/14 1:32:46.000 PM |

FIG. 9B

UTILIZING PERSISTENT AND NON-PERSISTENT CONNECTIONS FOR DISTRIBUTED TASKS FOR PERFORMING A JOB

PRIORITY CLAIM TO RELATED APPLICATION

This application is a continuation of U.S. Nonprovisional patent application Ser. No. 14/813,908, filed Jul. 30, 2015, entitled "Utilizing Distributed Tasks To Retrieve Supplemental Job Information For Performing A Job", which is a continuation of U.S. Nonprovisional patent application Ser. No. 14/448,048, filed Jul. 31, 2014, entitled "Distributed Tasks For Retrieving Supplemental Job Information," and issued as a U.S. Pat. No. 9,128,779 on Sep. 8, 2014, which are incorporated herein by reference herein.

TECHNICAL FIELD

The present disclosure relates to distributed jobs and, more particularly, to retrieving or synchronizing supplemental job information between multiple machines to enable the performance of the job.

BACKGROUND

Modern data centers often comprise thousands of hosts that operate collectively to service requests. During operation, some hosts may fragment a request into multiple jobs and distribute the jobs to other hosts to be processed. In some situations, the processing host may require additional data to complete the job. The additional data may be inaccessible to the processing host, for example, it may exist on a different host or require an interaction with a user. In this situation, an error is often produced and the job may need to be resubmitted.

BRIEF DESCRIPTION OF THE DRAWINGS

The present disclosure will be understood more fully from the detailed description given below and from the accompanying drawings of various implementations of the disclosure.

FIG. 8 illustrates an exemplary search query received from a client and executed by search peers in accordance with the disclosed embodiments.

FIG. 9B illustrates a data summary dialog that enables a user to select various data sources in accordance with the disclosed embodiments.

DETAILED DESCRIPTION

Figure 1:
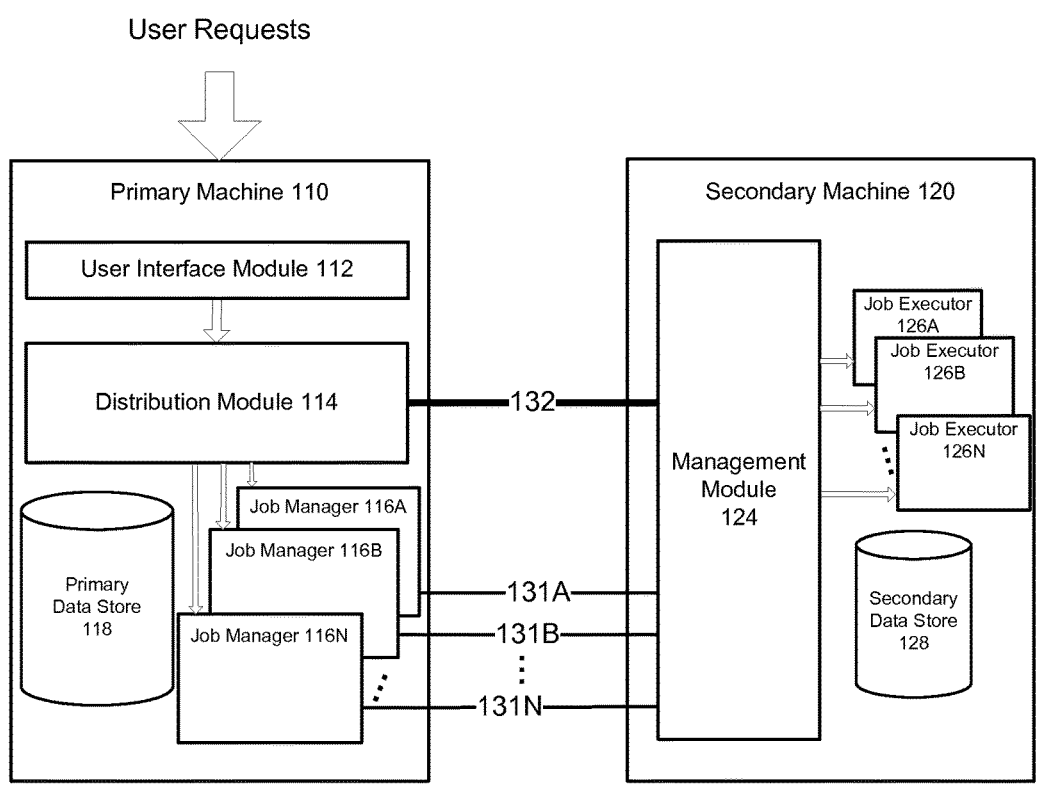
FIG. 1 presents a block diagram of a task distribution system in accordance with the disclosed embodiments.

The present disclosure relates to a method of retrieving and synchronizing information between multiple machines to assist with processing distributed jobs. The method may involve a primary machine that distributes jobs to one or more secondary machines to be processed. The jobs may be search jobs that include search queries that when executed generate search results. Prior to the completion of a job, the secondary machine may determine that supplemental job data may be useful to complete the job. The supplemental data may exist on another machine or may require an interaction with a user.

The primary machine and secondary machines may exchange the supplemental job data by utilizing distributed tasks in the form of task requests and their respective task responses. The task requests may be transmitted from the secondary machine to the primary machine and may pertain to specific items of information or specific entries in a data store (e.g., table or database). The primary machine may fulfill these requests and transmit the supplemental information within task responses. The secondary machine may use the supplemental information to complete the job and may also store it locally to be reused for other jobs. In one example, the task requests and task responses may be utilized to synchronize a data store (e.g., a table, a database, a file, etc.) that includes supplemental information across multiple machines.

The primary and secondary machines may be interconnected using multiple connections, for example, the machines may be connected by short-lived connections and long-lived connections. A short-lived connection may refer to a connection that exists for the duration of a dispatched job and is terminated when the dispatched job is completed, whereas a long-lived connection refers to a connection that may persist for more than one job. In one example, the long-lived connection may be a persistent connection that endures for the duration of all jobs performed between a set of machines and if the long-lived connection were interrupted, the machines would recreate it.

The short-lived and long-lived connections may handle different types of data in different quantities and formats. For example, a short-lived connection may handle transmitting job requests and their respective job results, whereas the long-lived connections may be dedicated to transmitting task requests for supplemental job information. Separating the types of information that traverse a connection may allow the system to have a receiver that is optimized to parse the specified format or to prioritize the transmission of certain information. For example, if a job begins producing a data set which is being streamed over the short-lived connection, it may be more efficient to send a task request for additional information necessary to complete the job over a long-lived connection which may be less utilized or may be prioritized to result in a faster turnaround time.

In one example, the primary machine may be a search head configured to distribute search jobs to a plurality of indexer machines that function as secondary machines. A search head may refer to a component that is responsible for a reduce phase of a map-reduce search, and indexers may refer to components that are responsible for a map phase of the map-reduce search, as further described below. The primary machines may be interconnected with the secondary machines in a manner that restricts the secondary machines from initiating connections with the primary machine, for example, to enhance security, privacy and/or performance. Despite this, the primary machine may be capable of initiating connections with the secondary machines. The connections may include short-lived Hyper Text Transfer Protocol (HTTP) connections and long-lived HTTP connections that utilize Representational State Transfer (REST) calls for transmitting data. The long-lived connection may be configured without a timeout or may be kept alive or recreated if it is interrupted, similar to an HTTP persistent connection. The job requests and responses as well as their associated task requests and responses may be transmitted over these connections in a JSON format.

In another example, the primary machine and the secondary machines may be part of a data aggregation and analysis system that can aggregate heterogeneous machine-generated data received from various sources, including servers, databases, applications, networks, etc. The system can be configured to perform real-time indexing of the source data and to execute real-time, scheduled, or historic searches on the source data. The heterogeneous machine-generated data that is being searched can include, for example, logs that track login attempts that end-users make when logging into various applications (e.g., email application, customer relationship management (CRM) application, human capital management (HCM) application, etc.). A user may wish to receive, for instance, up-to-date information indicating how many attempts have failed and can initiate a search query to obtain results indicating the attempts that may have failed. The indexer may search the source data using the search query and return a list of users that have failed to access an application.

In another instance, the heterogeneous machine-generated data may not have all the information necessary to fulfill a search query and the secondary machine may contact the primary machine to retrieve supplemental lookup information. For example, a user may request to receive up-to-date information indicating which employees have accessed which websites. The heterogeneous machine-generated data may include a web traffic log, which may include source IP addresses, destination IP addresses and the destination web site names. In order to fulfill the user request, the secondary machine may need additional data that resolves the source IP addresses to employees. This translation information may exist in a data store on the primary server and may be obtained by the secondary machine using distributed tasks. Once this information is obtained, the secondary machine may use this information to translate (e.g., map, link, correlate, associate) the source IP addresses in the web log to employees and determine which employees accessed which web sites in order to fulfill the user's request.

As discussed above, the secondary machine may use the distributed tasks to fetch information from a remote data store. In addition, the secondary machine may store the retrieved information in a local data store to keep the remote and local data stores synchronized. In one example, there may be a remote lookup data store on the primary machine and a local lookup data store on the secondary machine. As time elapses, entries may be added to the remote data store without being added to the local data store. When a job references the additional entries, the secondary machine may determine these entries are not in the local lookup data store and send a task request to retrieve the information from the remote data store. When the secondary machine receives the task response with the information it may store the information in the local data store and thus keep the local data store in partial synchronization with the remote data store.

Frequently in this disclosure, examples directed to jobs and/or tasks in a JSON format or transmitted using REST architecture over HTTP connections are presented. This is done for ease of explanation of some of the features described herein. However, embodiments with other formats and using other architectures are also within the scope of this disclosure, regardless of whether specific examples of such are provided herein.

FIG. 1 presents a schematic diagram of system 100, which includes primary machine 110 and secondary machine 120 connected by short-lived connections 131A-N and long-lived connection 132. Primary machine 110 may include a user interface module 112 for receiving user requests. Distribution module 114 may initiate one or more job managers 116A-D for managing the user requests received by the use interface module 112. Secondary machine 120 may include a management module 124 for handling the network connections with primary machine 110 and initiating one or more job executors 126A-N to process jobs. Each of the machines 110 and 120 may also have a data store 118 and 128 respectively for storing supplemental job information to be used for job processing.

Connections 131A-N and 132 may be communication channels that couple the primary machine 110 with secondary machine 120. Connections 131A-N may be short-lived connections which may exist for the duration of a dispatched job. The short-lived connection may handle transmitting job requests and their respective job results. Each short-lived connection may be initiated by its respective job manager module 114A-N to transmit a job from the primary machine 110 to the secondary machine 120. Once the secondary machine finishes performing a job, the job result may be transmitted back over the same short-lived connection and the connection may be subsequently closed. In one example, job manager 116A may initiate the connection by sending an HTTP POST request.

Connection 132 may be a long-lived connection that persists for a duration of time that is substantially longer than a short-lived connection. In one example, the connection 132 may persist for the duration of time that the two machines are configured to function together to process distributed jobs. This may extend beyond a connection interruption (e.g., machine failure or reboot), in which case once the machines are operational the connection may be re-established. In one example, primary machine 110 may initiate connection 132 with secondary machine 120 by making a REST GET call to management module 124.

Primary machine 110 may function as a central machine or distribution machine and may dispatch jobs to secondary machines 120. In one example, the primary machine may be a search head (e.g., in a SPLUNK® architecture discussed below) and may process a user search request by distributing the search across multiple indexer machines.

User interface module 112 may receive user information requests and present results to the user, for example, user interface module 112 may be a web module configured to provide a web interface or user interface document to the user. The user interface module 112 may be communicably coupled with distribution module 114 and may transmit user requests to the distribution module 114. In one example, the user interface module 112 may communicate with the distribution module 114 by invoking REST endpoints to send a search query.

Distribution module 114 may receive user requests from the user interface module and may segment the request into multiple jobs. Distribution module 114 may then initiate one or more job managers 116A-N to manage the jobs. In one example, distribution module 114 may spawn job managers 116A-N as separate child processes on the same machine (e.g., primary machine 110) and subsequently distribute the jobs to them. Distribution module 114 may also monitor the returned job results and set up dispatch directories (e.g., folders, data stores, files) to store and aggregate the results.

Distribution module 114 may also handle receiving and resolving task requests for supplemental job information. This may include initiating long-lived connection 132 between primary machine 110 and secondary machine 120 to receive the task requests. The task requests may be received individually or they may be batched together and transmitted as a continuous stream of task requests. In one example, a new long-running connection may be created when distribution module 114 makes an HTTP GET call. As a result of the GET call, the distribution module 114 may receive a list of task requests. The list of tasks may be read entry by entry, wherein each entry is a separate task associated with the same job executor or associated with a different job executors(e.g., 116A-N).

Job managers 116A-N may be responsible for transmitting jobs received from distribution module 114 to secondary machines 120 for processing. Job managers 116A-N may initiate short-lived communication channel 132A-N with secondary machines 120. Each short-lived connection may exist for the duration of time the job is being processed. For example, the short-lived connection may be created to send over a job and once the job results are received, the job manager may close the connection.

Each job manager 116A-N may be capable of setting up the job and processing the job results. Setting up the job may include breaking the job into separate smaller jobs (e.g., job fragments, job segments, job portions), which may be processed independently from one another. Each smaller job may involve accessing different data sources and/or each smaller job may run on different secondary machines. The job manager may create the new job locally and then transmit the job to create the job on the remote machine, for example, job manager 116A-N may send an HTTP POST request to secondary machine 120 to create the job. The job manager may also process the job results as they are streamed back from the secondary machine. In one example, each job may result in a separate pipeline streamed over a short-lived connection.

As shown in FIG. 1, each job manager has a single short-lived connection with secondary machine 120, however in another example each job manager 116A-N may have a short-lived connection with a different secondary machine. In addition, a single job manager may have multiple connections, each with a different secondary machines to which it sends a portion of the job.

Secondary machine 120 may function as a distribution node or processing node and may receive jobs from primary machine 110 and return the job results. Secondary machine 120 may include a management module 124, one or more job executors 126A-N and data store 128. In one example, the secondary machine may be a search indexer in a SPLUNK® architecture.

Management module 124 may manage the secondary machine's interactions with primary machine 110. This may include managing network connections, tasks (e.g., requests and responses), and job processing. Managing network connection may include receiving a request from the primary machine 110 to initiate a network connection and subsequently establishing (e.g., opening, creating) a connection (e.g., HTTP, TCP or UDP). Managing job processing may include receiving incoming job requests and creating one or more job executors 126A-N to process the job. In one example, management module 124 may spawn job executors 126A-N as separate child processes on the same machine and subsequently transmit the jobs to them to be executed.

Managing tasks may include organizing and processing the task requests and task responses. The task requests may be received from one or more job executors 126A-N. The task requests may then be organized by management module 124 into a list, queue, array or other similar data structure. This list may include information (e.g., GUID-Globally Unique Identifier or other similar identifier) that allows the management module to identify each task and determine which job the task is associated with, for example, the list may include an ID of the task request and an ID of the Job. After generating the list, management module 124 may determine the appropriate primary machine(s) to receive the task requests. This determination may be based on which primary machine sent the corresponding job. It may also depend on the primary machine's ability to access the target data location (e.g., data store), which may be inferred based on the failure or success of previous task responses (e.g., analysis of error messages).

In one example, management module 124 may send the same task request to multiple primary machines in an attempt to decrease the fulfillment time. The management module may then process the results from the primary machine that responded first and either inform the other machines to abort or ignore their subsequent task response.

Job executors 126A-N may function to perform the job and return the results to the management module 124. In one example, performing a job includes executing the search by querying an index for index entries and returning the search results in the form of a data pipeline (e.g., stdout or HTTP out).

Data stores 118 and 128 may be communicatively coupled to some or all of the modules on their respective machines and may be used to store supplemental information pertaining to the distributed jobs. The data store may be a single file (CSV file) or combination of multiple files or it may be a database (e.g., relational database). In one example, primary data store 118 may store lookup information that may be accessed by the job executor to assist with processing the jobs.

Data stores 118 and 128 may be remotely accessed or synchronized using distributed tasks (e.g., task requests and task responses). The synchronization may be either one-way or two-way (i.e., duplex) and it may be based on a pull mechanism, push mechanism or hybrid of both. One-way synchronization may occur, for example, when data store information is transmitted from a master (e.g., primary data store 118) to a replica (e.g., secondary data store 128) without data store information being transmitted from the replica to the master. Two-way synchronization may result in data store information being transmitted from the replica to master and master to replica. A pull mechanism may exist when the replica requests information from the master whereas a push mechanism may have the master send the data to the replica at a time chosen by the master. In one example, synchronizing data stores 118 and 128 may comprise a pull based one-way synchronization, for example the data store on the secondary machine may utilize task request 240 to pull supplemental information from the primary machine without sending supplemental information from the secondary store to the primary store.

Primary machine 110 and secondary machine 120 may be separate computing devices or they may be hosted on the same computing device. In one example, primary machine 110 may be a first virtual machine and secondary machine 120 may be a second virtual machine and both the first and second virtual machines may be run on the same host or different hosts.

Figure 2A:
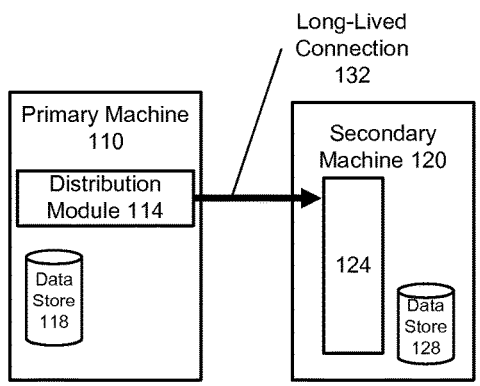
FIGS. 2A-D present block diagrams of a task distribution system in accordance with the disclosed embodiments.

FIGS. 2A-D disclose an example system 200 for disseminating supplemental information to assist with the processing of distributed jobs. As seen in FIG. 2A, primary machine 110 may initiate long-lived connection 132 with secondary machine 120. This may occur when the primary machine is being configured to function with secondary machine 120, for example, during a setup procedure performed by an IT administrator or automatically on a subsequent reboot. During the configuration, or after, the data stores on both machines may be synchronized. This may be accomplished by copying over the data store, or a portion of the data store, from the primary machine to the secondary machine. Alternatively, the data stores may be synchronized by transmitting supplemental job information that exists in primary data store 118 to the secondary machine to be stored in secondary data store 128.

In one example, primary machine 110 may utilize a REST GET endpoint to initiate long-lived connection 132 with secondary machine 120. The GET call may result in the secondary machine 120 transmitting all of its unresolved tasks, for example, those included on the task list stored by the management module 124. In addition, each time a new task is created on the secondary machine it may be transmitted and sent over long-lived connection 132.

To avoid excessive or irrelevant task requests the machines may include a task filtering component. The task filtering component may be included within distribution module 114 of the primary machine and/or within the management module 124 of the secondary machine. The task filtering component may function to parse out or filter out the task requests and/or task responses that are irrelevant to the receiving machine. This may be useful when a machine is connected to multiple machines because it may reduce the quantity of task requests and task responses to only those the machine is responsible for processing.

Figure 2B:
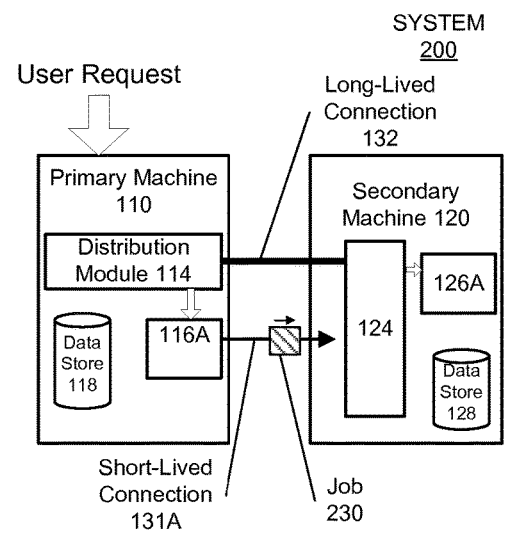

As seen in FIG. 2B, after the machines have been configured, the primary machine 110 may receive a user request (e.g., search query) from a user. The distribution module 114 then may create (e.g., spawn) job manager 116A to process the user's request. Job manager 116A may then initiate short-lived connection 131A and transmit job 230 to the management module 124 (e.g., splunk daemon) of secondary machine 120. The management module 124 may then create job executor 126A to perform the job. In one example, job 230 may be a search job in a JSON format and it may be transmitted to the secondary machine using an HTTP POST request.

Figure 2C:
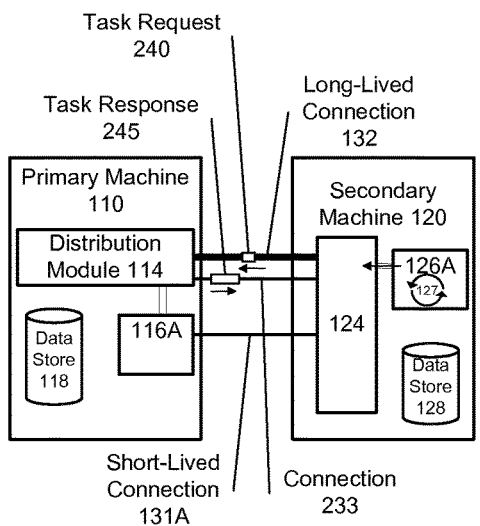

As seen in FIG. 2C, job executor 126A may begin processing job 230 as shown by circular arrow 127, and may determine it requires supplemental job information in order to complete the execution of job 230. Job executor 126A may then create a new distributed task and send it to management module 124. The task request may include a task identifier (e.g., GUID) and may identify a specific object (e.g., IP address, machine, user) for which supplemental information is being retrieved. This information may be in computer readable or human readable format such as, for example, JSON, XML, HTML, ASCII or Unicode.

In one example, job executor 126A may create task request 240 by making an HTTP POST call to the management module on the same machine. This POST call may avoid creating an additional HTTP connection since the destination is on the same machine and instead it may stream data to HTTP out which may be received by the management module. HTTP out may be a stream similar to a standard stream (e.g., standard out (stdout), standard in (stdin) or standard error (stderr)), which may allow processes on a machine to communicate with other processes running on the same machine without initiating a connection with the receiving process. The POST call may include JSON data in the following format: receiver:"foo.com", type:"state_store_lookup", data: "192.168.0.101", wherein "foo.com" is the name of a primary machine and "192.168.0.101" is the lookup key value. The lookup key value may match the key of an entry in a table or database on the remote machine (e.g., primary machine 110). Job executor 126A may then block this connection with the management module so that it remains open until the task response is received by the job executor 126A, at which point it may close the connection.

Management module 124 may compile and store a list of unresolved distributed tasks, which may include task request 240 as well as task requests from other job executors. Management module 124 may transmit distributed task request 240 along with the other task requests in the list over long-lived connection 132. In one example, the task requests may be transmitted as a streamed response to the HTTP GET request that was used to initiate the long-lived connection during the setup procedure.

Distribution module 114 may receive the task requests and may include a parsing component for distinguishing separate and independent tasks. Separate tasks may be tasks that can be resolved independently of one another yet may be affiliated with the same job, job executor, or job manager. Independent tasks are tasks that are not affiliated with the same job and may originate from a different job executors or job manager. The parsing component may distinguish tasks by detecting, for example, the end of a JSON structure or a specific control character used to indicate the beginning or end of a task request (e.g., carriage return, newline, line feed). In addition, the parsing component may detect whether the tasks are affiliated with the same job by analyzing identification information, which may be included within the task request. (e.g. the GUID of the job). In one example, the distribution module 114 may receive a task list as a continuous stream of task requests and may use the parsing component to read the task requests entry by entry and each entry may be for a separate and independent task.

The distribution module 114 on primary machine 110 may then resolve each task request by fetching the supplemental job information from, for example, data store 118 or from any other accessible storage location. Alternatively, primary machine 110 may determine that the supplemental job information is not accessible to the primary machine. In this case, it may either communicate with another machine (e.g., primary or secondary machine) or it may notify the user that the supplemental job information is needed, for example via user interface module 112.

Once the supplemental job information has been fetched, the distribution module 114 may package and transmit the information to secondary machine 120 within task response 245. If the supplemental job information is not available, the distribution module 114 may still respond and resolve (e.g., complete) the task request, however the task request may be resolved with an error or fail-result. The task response may be transmitted to the management module 124 over connection 233, which may be a short-lived connection similar to connection 131A. As an alternative, the task response may be transmitted over the same long-lived connection that transmitted the task request (e.g., connection 132). In one example, the primary machine 110 may resolve each task request by sending task result 235 as an HTTP POST request with supplemental job information or error message within the body of the response.

Management module 124 may then transmit the task result received from the distribution module to the appropriate job executor, in this case, job executor 126A. This may allow job executor 126A to obtain the supplemental job information and complete the execution of job 230. In addition, management module 124 or job executor 126A may store the supplemental information in secondary data store 128 to be accessed by other job executors.

In addition to providing supplemental information, system 100 may use the distributed tasks (e.g., task requests and task responses) to perform data store synchronization across multiple machines. In one example, synchronizing data stores 118 and 128 may comprise a pull based one-way synchronization, for example the data store on the secondary machine may utilize task request 240 to pull supplemental information from the primary machine without sending supplemental information from the secondary store to the primary store. An example of a pull synchronization is one in which the secondary data store (e.g., replica) requests that the primary data store (e.g., master) send missing or updated data store information.

Figure 2D:
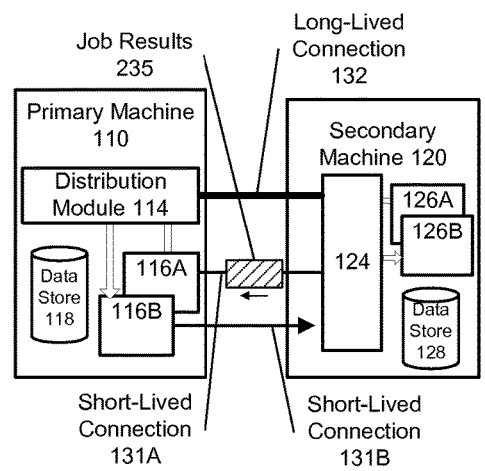

As seen in FIG. 2D, job result 235 may be transmitted from secondary machine 120 to primary machine 110 over short-lived connection 131A. The job result 235 may include information (e.g., events) gathered by job executor 126A and streamed via stdout to management module 124. Management module 124 may then stream the results as an HTTP response to the initial HTTP POST that created the job. As shown in FIG. 2B and 2D the job and its job results may be transmitted over the same connection, however in another example the job results may be sent over a different short-lived connection.

Primary machine 110 and secondary machine 120 may be capable of processing multiple jobs concurrently. As shown in FIG. 2D, distribution module 114 may spawn a second job manager 116B which may process a second job. Job manager 116B may initiate a second short-lived connection 131B to transmit a job to secondary machine 120. Management module 124 may receive the job and initiate a second job executor 126B. Although the second job may be different than job 230 and executed by a different job executor it may require the same supplemental job information. As discussed above the supplemental information may have been stored in data store 128 when job executor 126A requested it and may be accessible to job executor 126B, thus avoiding the transmission of additional task requests.

System 200 may be scaled-up to include multiple primary machines 110 and multiple secondary machines 120 for increased performance and/or fault tolerance. Each primary machine 110 may be configured to dispatch jobs to multiple secondary machines 120. In this case, the primary machine 110 may have a long-lived connection to each secondary machine, for example, if the primary machine dispatches its jobs to 10 separate machines the primary machine may have 10 long-lived connections. In addition, each secondary machine 120 may be configured to receive dispatched jobs from one or more primary machines. As such, the secondary machine may have a long-lived connection with each primary machine, for example, if the secondary machine receives jobs from 3 different primary machines, it may have three long lived connections, one with each of the three primary machines. In one example, although a machine may have multiple long-lived connections, it may only have a single long lived connection with a specific machine and as such there may only be one long-lived connection between any and all pairs of machines.

When a primary machine has connections with multiple secondary machines, the job managers 116A-B on the primary machine may each manage a job on a different secondary machine. In one example, job manager 116A may dispatch a job to secondary machine 120 whereas job manager 116B may dispatch its job to a different secondary machine. Likewise, job executors 126A-B on the secondary machine may execute jobs that have been dispatched by different primary machines, for example, job executor 126A may process a job from primary machine 110 as shown in FIG. 2D, however job executor 126B may process a job from another primary machine.

Figure 3A:
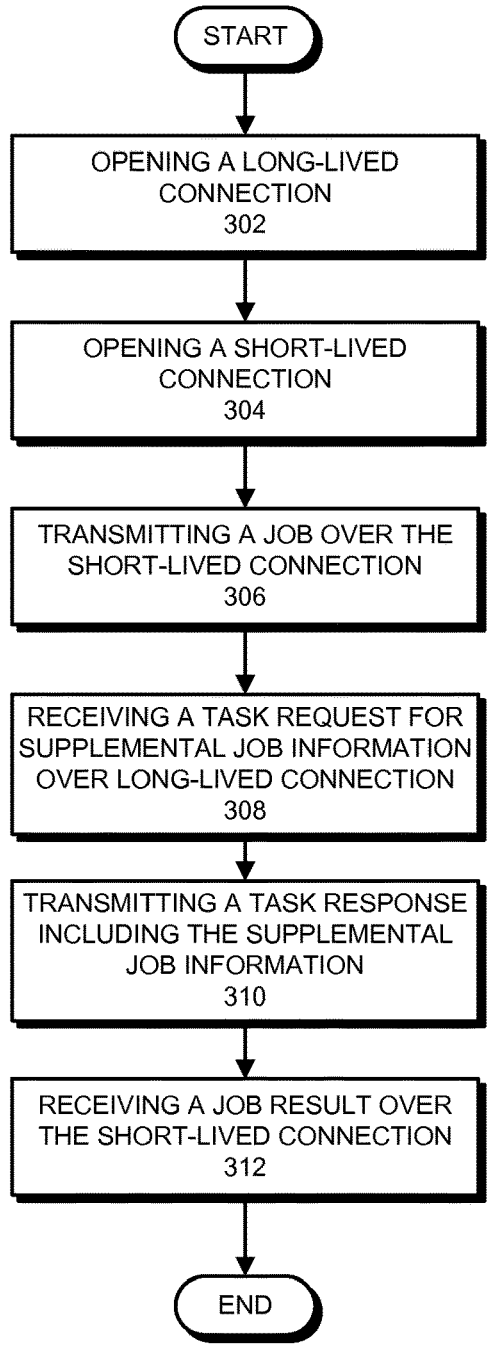
FIG. 3A-B present flowcharts illustrating how a primary and secondary machine disseminate supplemental job information in accordance with the disclosed embodiments.

FIG. 3A is a flow diagram of method 300 for retrieving supplemental job information to assist with processing distributed jobs, in accordance with one or more aspects of the present disclosure. The method may be performed by processing logic that may comprise hardware (circuitry, dedicated logic, etc.), software (such as is run on a general purpose computer system or a dedicated machine), or a combination of both. In one implementation, the method 300 is performed by the server computing machine.

At block 302, the computing machine (e.g., primary machine 110 or search head) opens long-lived connection 132 with secondary machine 120, long-lived connection 132 being dedicated to task requests. Long-lived connection 132 may be an HTTP connection transmitting data in accordance with a REST architecture, and opening the long-lived connection may involve initiating an HTTP GET call and establishing a persistent HTTP connection. The data received over the long-lived connection may be a stream of separate task requests in a Java Script Object Notation (JSON) format.

Next at block 304, the computing machine may open a short-lived connection 131A-N with secondary machine 120. The short-lived connection may be an HTTP connection transmitting data in accordance with a REST architecture. In one example, secondary machine 120 may be prevented from initiating a connection with primary machine 110, for example, the network infrastructure (e.g., switches, routers, proxy servers) connecting machines 110 and 120 or software running on the machines (e.g., firewall) may restrict the type of connections based on the protocols, ports, or IP addresses used for the connection. As a result, both the short-lived and long-lived connection may be initiated by the primary machine instead of the secondary machine. The long-lived connection 132 may be opened before the short-lived connection and may persist beyond the closing of the short-lived connection.

At block 306, the computing machine may use short-lived connection 131A-N to transmit job 230 to secondary machine 120 and secondary machine 120 may perform the job. The job may, for example, include a search query and produce search results including a dataset derived using a late binding schema.

Then at block 308, the computing machine may receive over long-lived connection 132 a task request 240 for supplemental job information pertaining to job 230. The task requests may be received only over long-lived connection 132 without being received over any other connection. Long-lived connection 132 may be a one-way connection in that it is dedicated to receiving tasks from the secondary machine without transmitting tasks to the secondary machine.

At block 310, the computing machine may transmit a task response 245, which includes the supplemental information, to secondary machine 120. In one example, the computing machine may transmit task response 245 over a third connection. This may be done by opening the third connection with secondary machine 120 and then transmitting task response 245 over the third connection. It may then close the third connection as if it was a short-lived connection.

The computing machine may include a lookup-table having entries that map IP addresses to users and one or more of these entries may be included as supplemental information within a response to the task. The computing machine may also include a primary data store 118 and secondary machine 120 may include secondary data store 128 and the computing machine may use the task responses for synchronizing a portion of primary data store 118 with secondary data store 128.

At block 312, the computing machine may receive over the short-lived connection a job result and may then format the results and present (e.g., display) them to the user. The computing machine may also close the short-lived connection but may maintain the long-lived connection for potential task requests associated with other jobs.

Figure 3B:
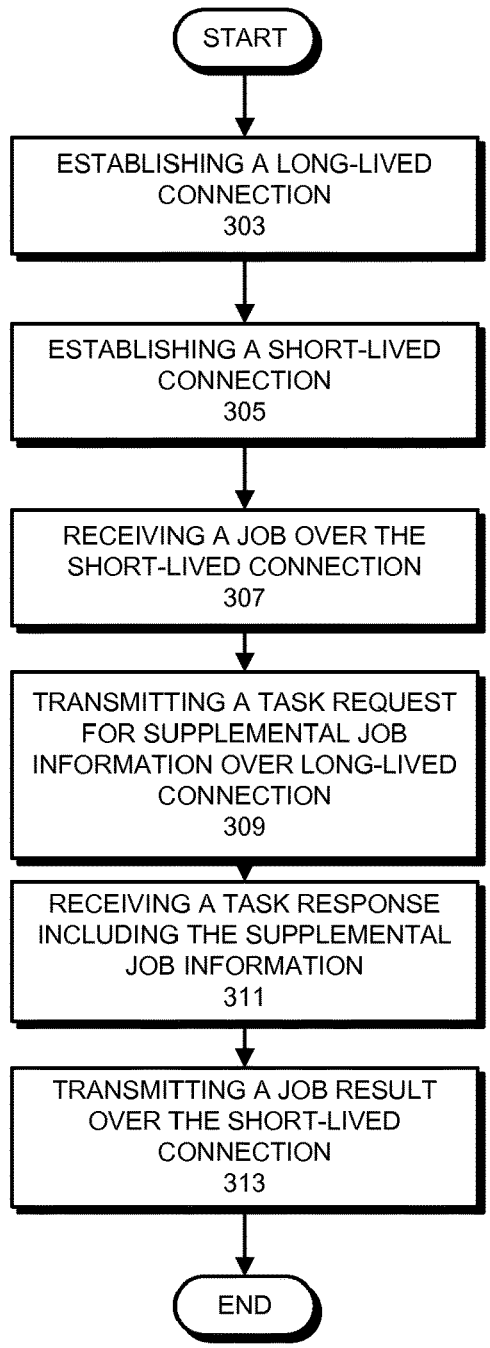

FIG. 3B is a flow diagram of method 350 for retrieving supplemental job information to assist with processing distributed jobs, in accordance with one or more aspects of the present disclosure. Method 350 may be similar to method 300 performed by primary machine 110 and may be performed by processing logic that may comprise hardware (circuitry, dedicated logic, etc.), software (such as is run on a general purpose computer system or a dedicated machine), or a combination of both. In one implementation, the method 300 is performed by the server computing machine.

At block 303, the computing machine (e.g., secondary machine 120 or indexer) establishes long-lived connection 132 with primary machine 110. The establishment of a connection may not be the same as initiating a connection, rather it may comprise responding to a connection request to create the connection (e.g., three way handshake).

Next at block 305, the computing machine may establish a short-lived connection 131A-N with primary machine 110. The short-lived connection may be an HTTP connection transmitting data in accordance with a REST architecture.

At block 307, the computing machine may receive job 230 over short-lived connection 131A-N and may perform the job. The job may, for example, include a search query and produce search results derived using a late binding schema.

Then at block 309, the computing machine may transmit over long-lived connection 132 a task request 240 for supplemental job information pertaining to job 230. The task requests may be transmitted only over long-lived connection 132 without being transmitted over any other connection. Long-lived connection 132 may be a one-way connection dedicated to transmitting tasks to the primary machine without receiving tasks from the primary machine.

At block 311, the computing machine may receive a task response 245, which includes the supplemental information from primary machine 110. In one example, the computing machine may receive task response 245 from the primary machine over a third connection. In another example, the computing machine may receive task response 245 over the long-lived connection.

At block 313, the computing machine may transmit over the short-lived connection a job result in response to the job. The computing machine may also close the short-lived connection but maintain the long-lived connection for potential task requests associated with other jobs.

Aspects of the above examples may be used in combination with the SPLUNK® architecture discussed below to enhance functionality and performance without reducing security and/or privacy. For example, the secondary machines may be able to execute jobs that may have failed in the past due to missing information and this may be accomplished without reducing security (e.g., without allowing the secondary machines to initiate connections with the primary machines).

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 4:
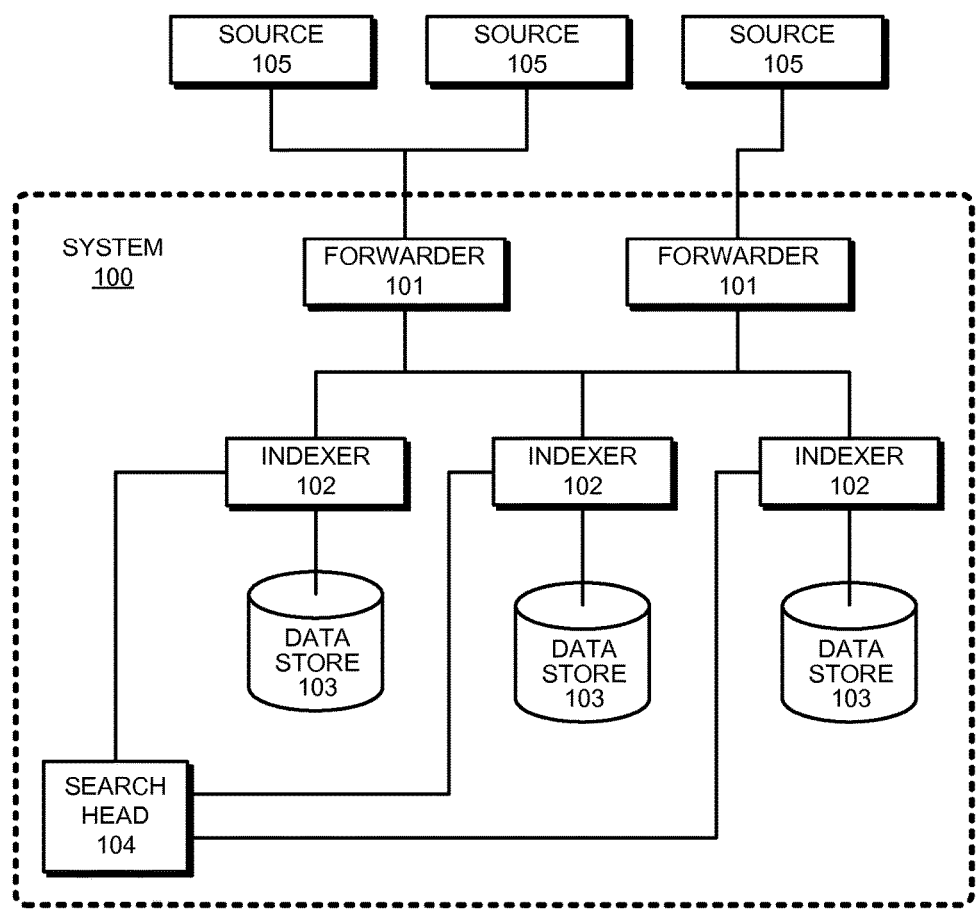
FIG. 4 presents a block diagram of an event-processing system which may utilize the task distribution system in accordance with the disclosed embodiments.

FIG. 4 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 4-8 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Data Ingestion

Figure 5:
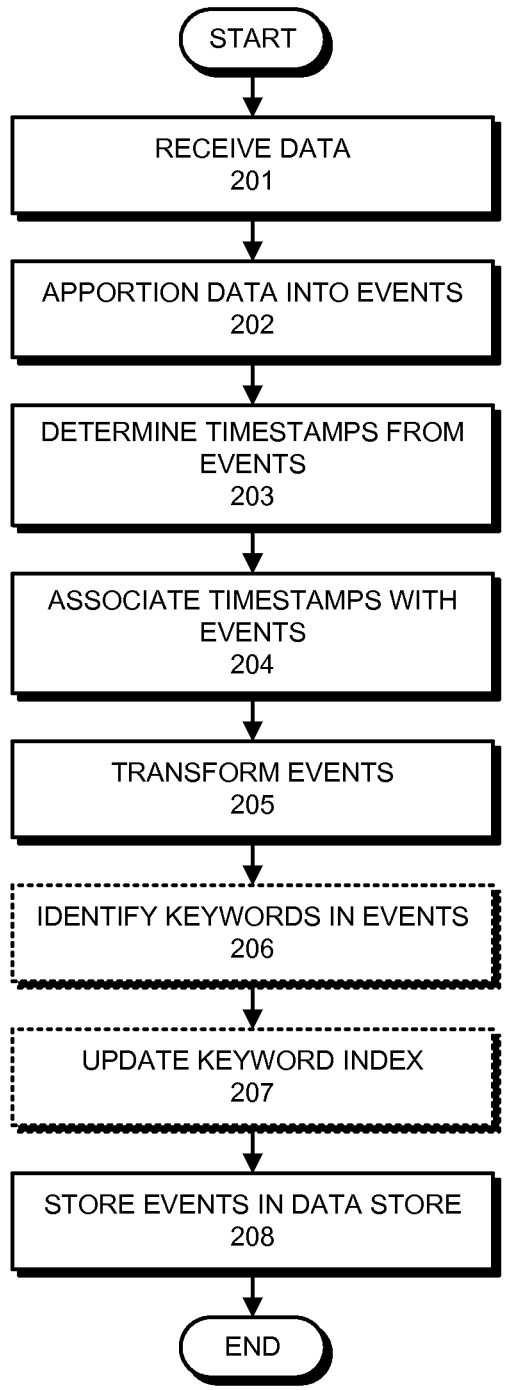
FIG. 5 presents a flowchart illustrating how indexers process, index, and store data received from forwarders in accordance with the disclosed embodiments.

FIG. 5 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 6:
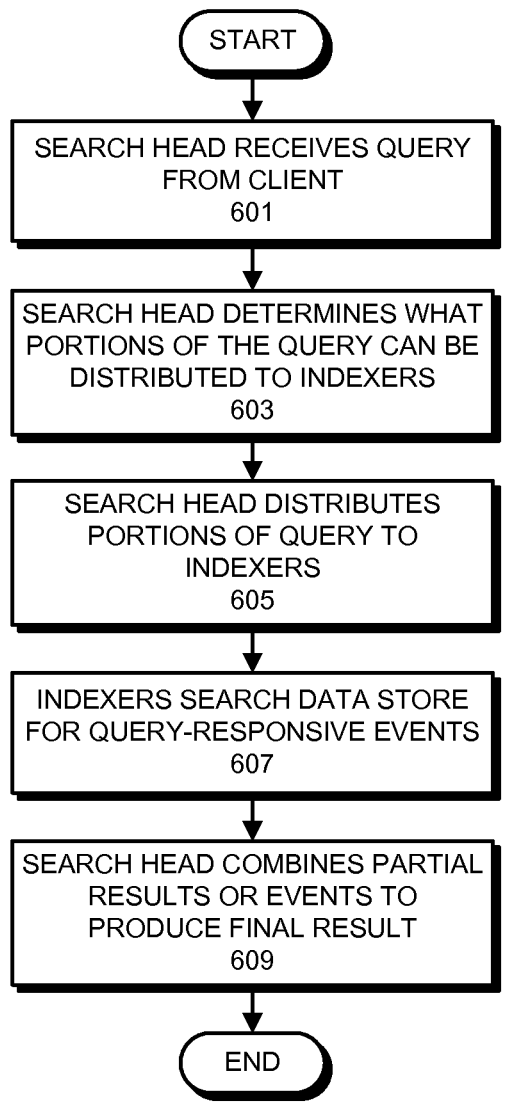
FIG. 6 presents a flowchart illustrating how a search head and indexers perform a search query in accordance with the disclosed embodiments.

FIG. 6 presents a flowchart illustrating how a search head and indexers perform a search query in accordance with the disclosed embodiments. At the start of this process, a search head receives a search query from a client at block 601. Next, at block 603, the search head analyzes the search query to determine what portions can be delegated to indexers and what portions need to be executed locally by the search head. At block 605, the search head distributes the determined portions of the query to the indexers. Note that commands that operate on single events can be trivially delegated to the indexers, while commands that involve events from multiple indexers are harder to delegate.

Then, at block 607, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 607 may involve using the late-binding scheme to extract values for specified fields from events at the time the query is processed. Next, the indexers can either send the relevant events back to the search head, or use the events to calculate a partial result, and send the partial result back to the search head.

Finally, at block 609, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 7:
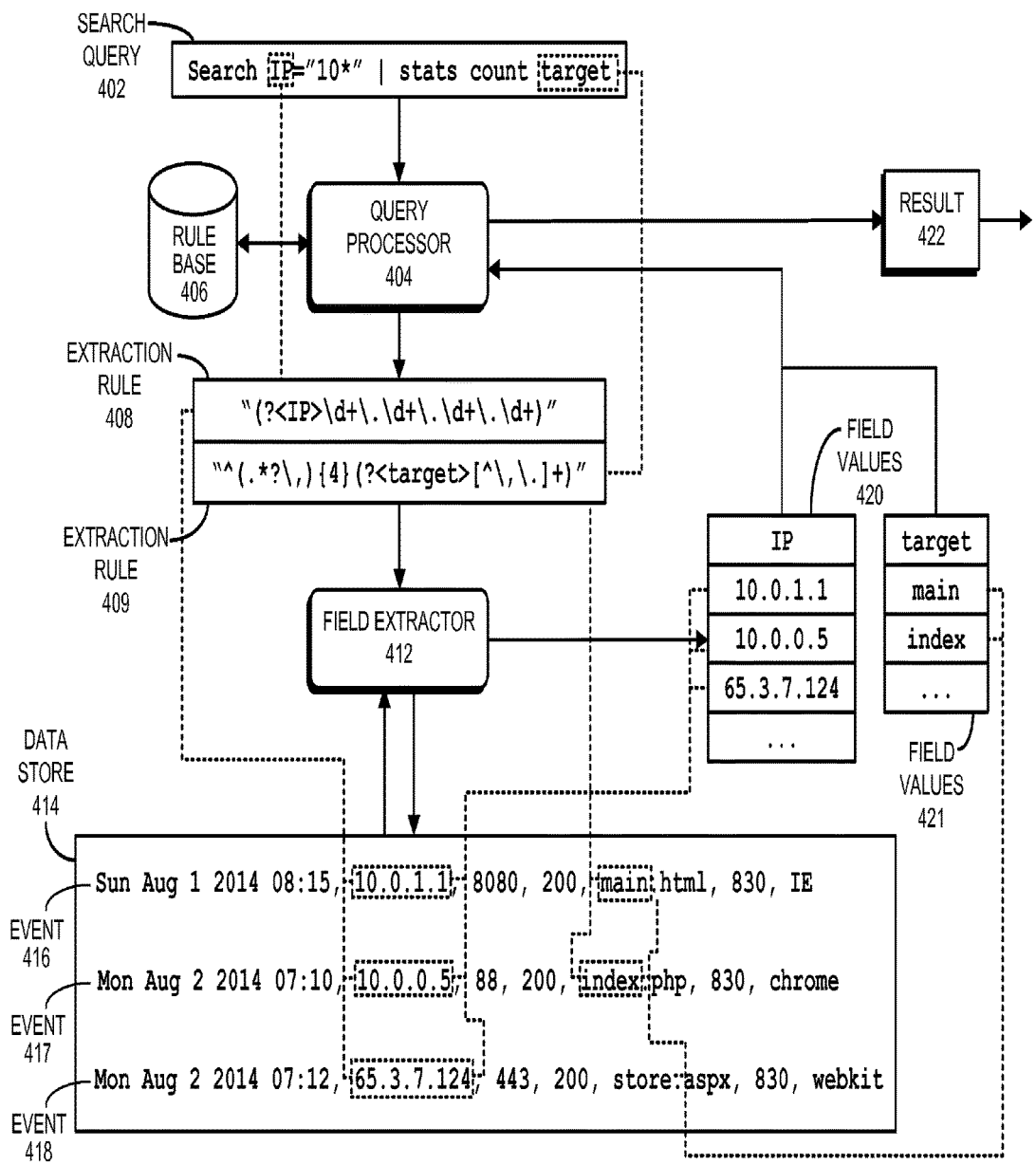
FIG. 7 presents a block diagram of a system for processing search requests that uses extraction rules for field values in accordance with the disclosed embodiments.

FIG. 7 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 7 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 7, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 7. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 9A:
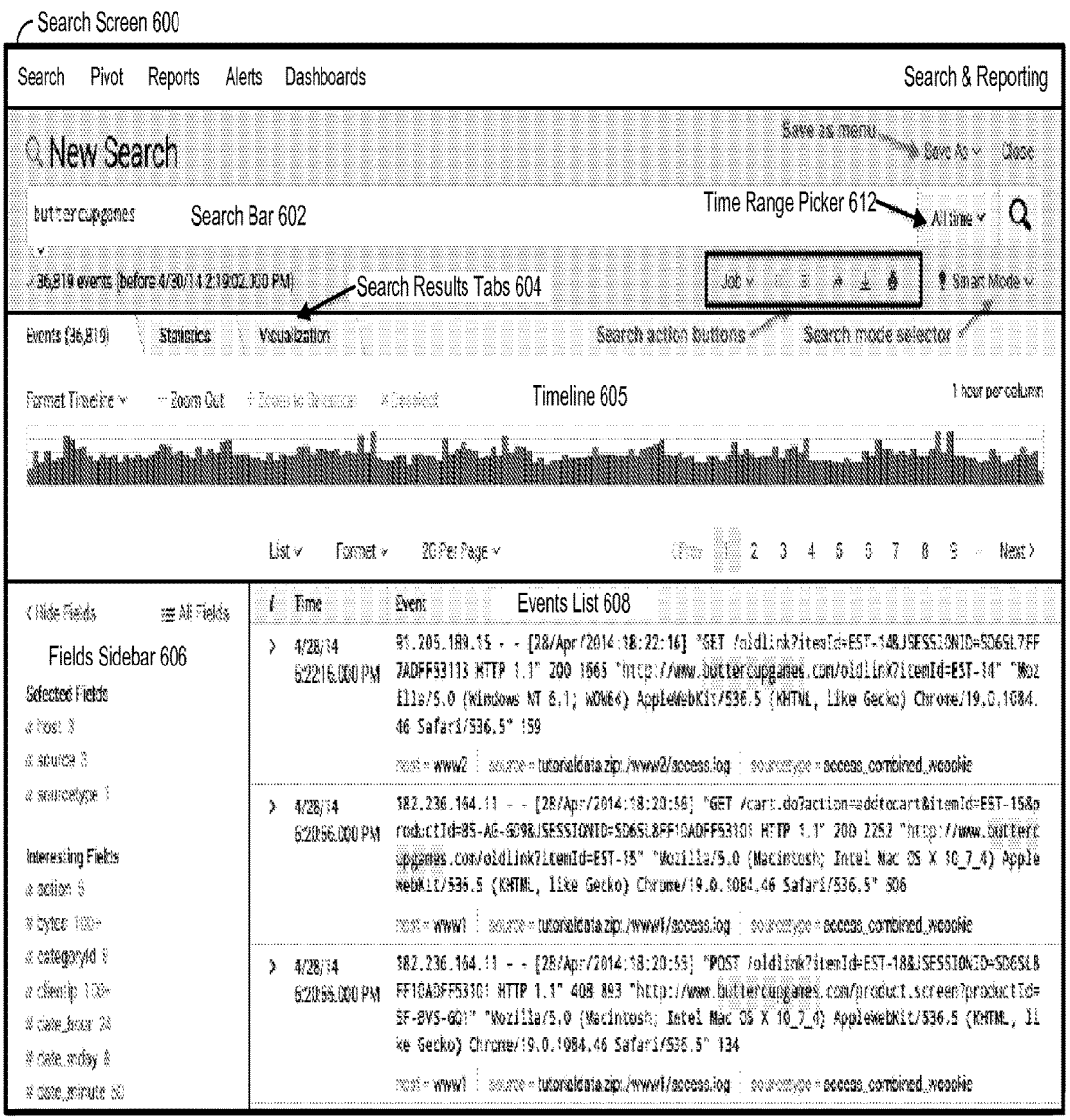
FIG. 9A illustrates a search screen in accordance with the disclosed embodiments.

FIG. 9A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 9B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 9A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 8 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 6, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

Keyword Index

As described above with reference to the flow charts in FIGS. 5 and 6, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 10A:
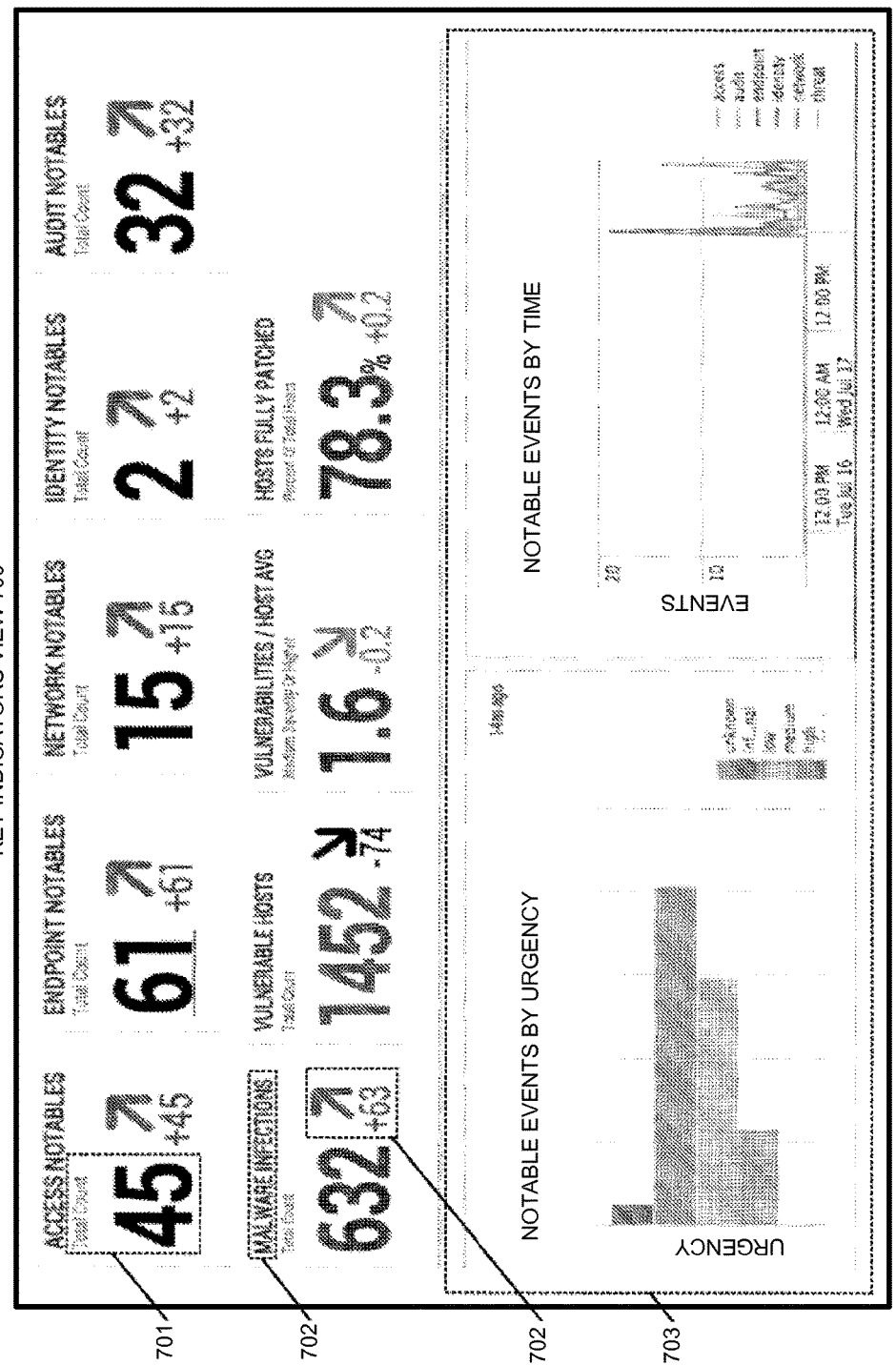
FIG. 10A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 10A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 10B:
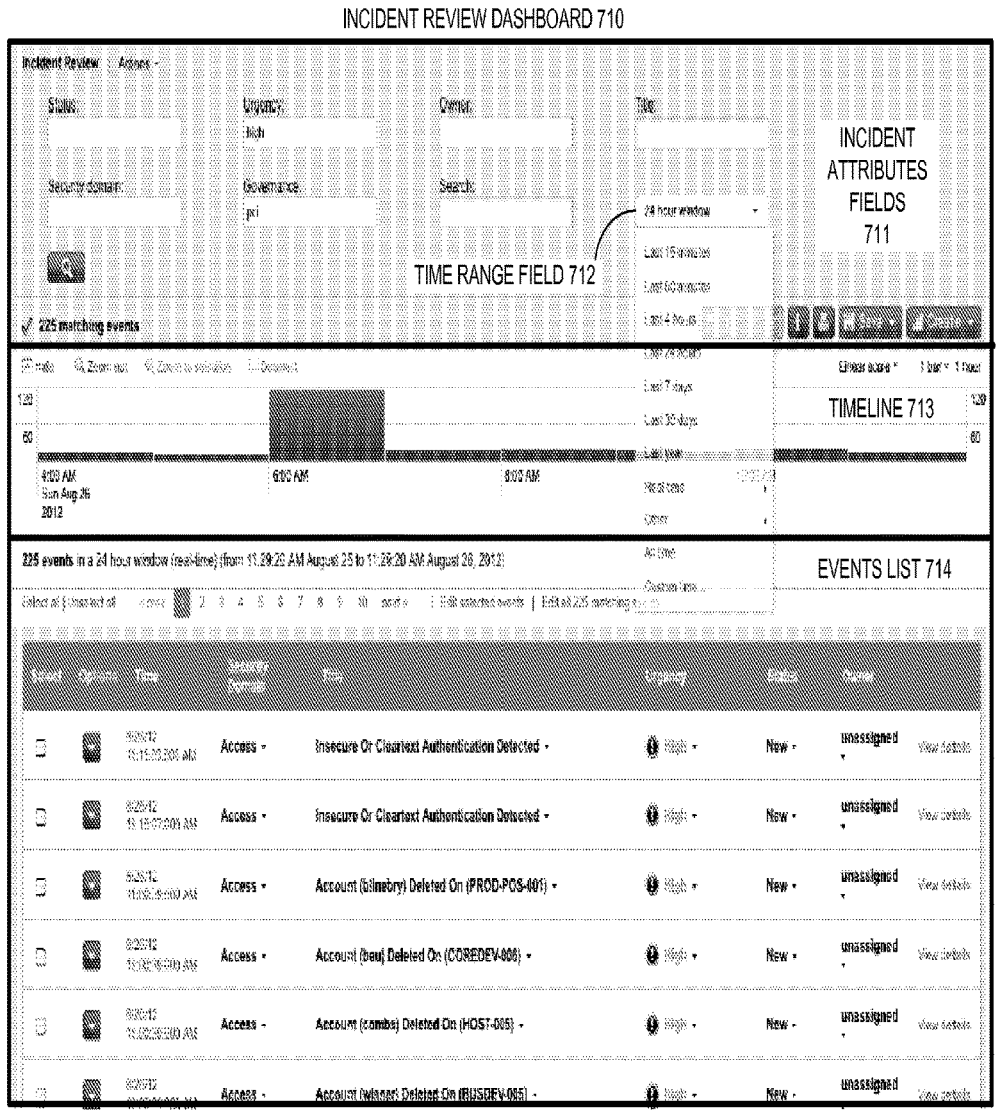
FIG. 10B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 10B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. Pat. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551- monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 10C:
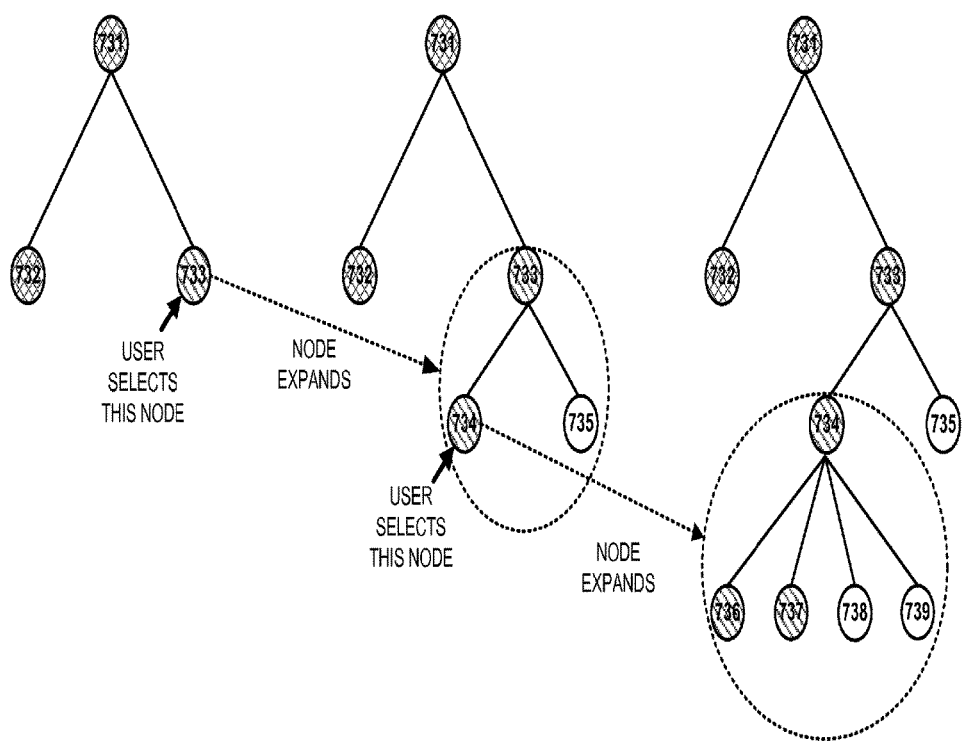
FIG. 10C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 10C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 10D:
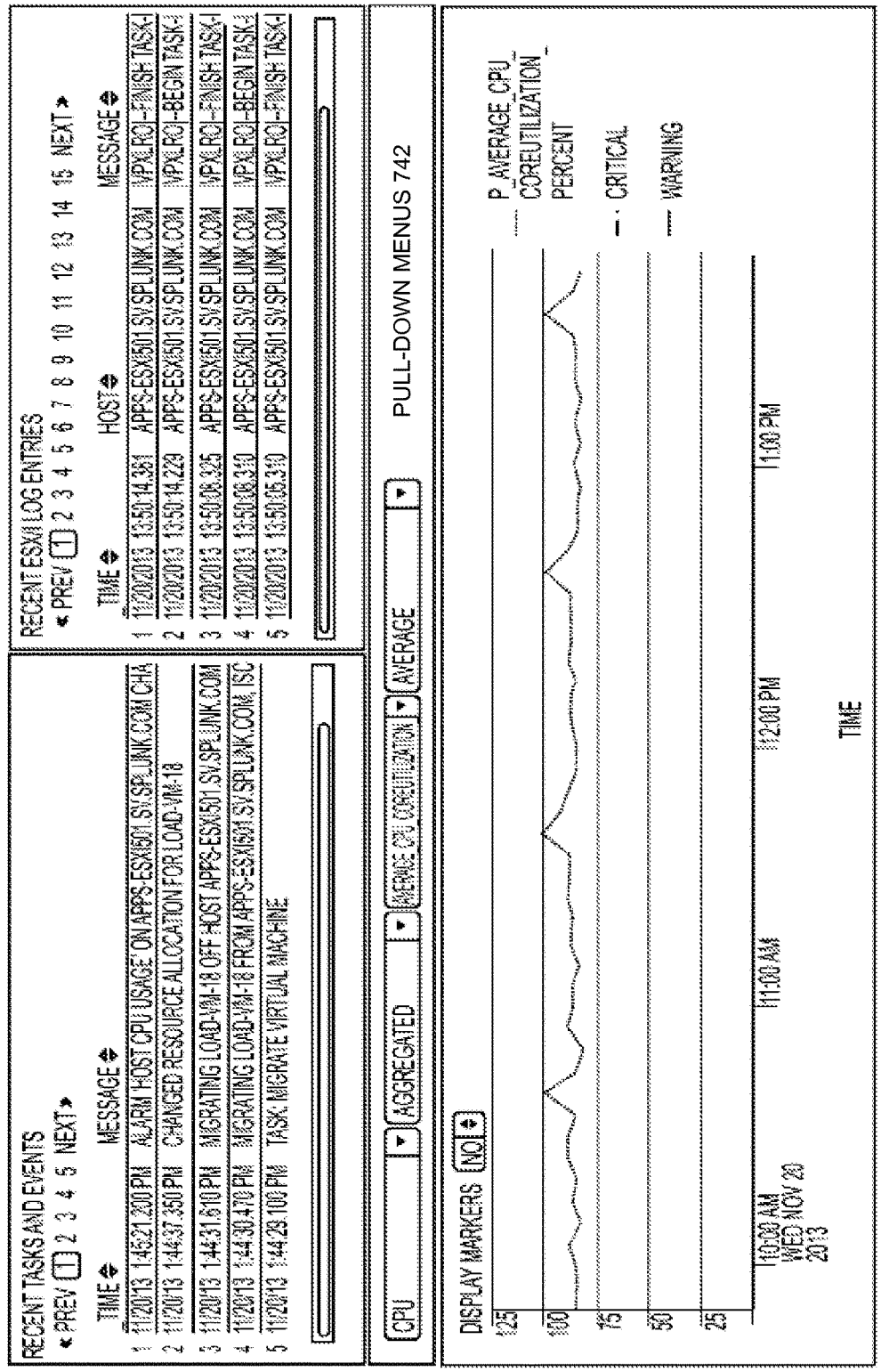
FIG. 10D illustrates a screen displaying both log data and performance data in accordance with the disclosed embodiments.

The SPLUNK® APP FOR VMWARE ® also provides a user interface that enables a user to select a specific time range and then view heterogeneous data, comprising events, log data and associated performance metrics, for the selected time range. For example, the screen illustrated in FIG. 10D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Figure 11:
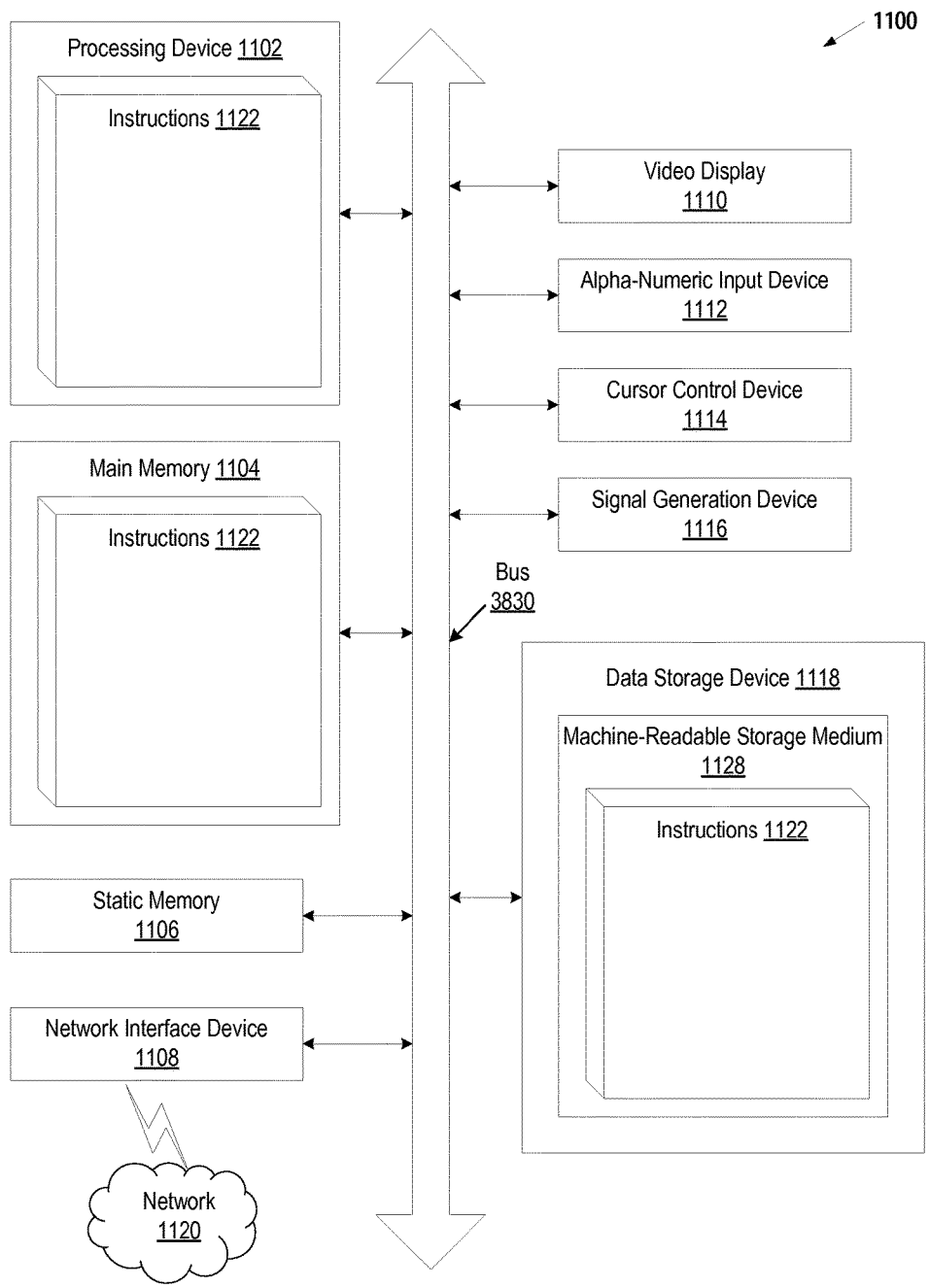
FIG. 11 presents a block diagram illustrating an exemplary system architecture in accordance with the disclosed embodiments.

FIG. 11 illustrates a diagram of a machine in an example form of a computer system 1100 within which a set of instructions, for causing the machine to perform any one or more of the methodologies discussed herein, may be executed. The computer system 1100 can be primary machine 110 or secondary machine 120 as shown in FIG. 1. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processing device (processor) 1102, a main memory 1104 (e.g., read-only memory (ROM), flash memory, dynamic random access memory (DRAM) such as synchronous DRAM (SDRAM), double data rate (DDR SDRAM), or DRAM (RDRAM), etc.), a static memory 1106 (e.g., flash memory, static random access memory (SRAM), etc.), and a data storage device 1118, which communicate with each other via a bus 1130.

Processor (processing device) 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1102 may also be one or more special-purpose processing devices such as an application specific integrated circuit (ASIC), a field programmable gate array (FPGA), a digital signal processor (DSP), network processor, or the like. The processor 1102 is configured to execute instructions 1122 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an input device 1112 (e.g., a keyboard, and alphanumeric keyboard, a motion sensing input device, touch screen), a cursor control device 1114 (e.g., a mouse), and a signal generation device 1116 (e.g., a speaker).

The data storage device 1118 can include a computer-readable storage medium 1128 on which is stored one or more sets of instructions 1122 (e.g., software) embodying any one or more of the methodologies or functions described herein. The instructions 1122 can also reside, completely or at least partially, within the main memory 1104 and/or within the processor 1102 during execution thereof by the computer system 1100, the main memory 1104 and the processor 1102 also constituting computer-readable storage media. The instructions 1122 may further be transmitted or received over a network 1120 via the network interface device 1008.

In one implementation, the instructions 1122 include instructions for a primary machine module (e.g., module 112, 114 and 116 of FIG. 1) and/or a software library containing methods that call the correlation search wizard module. In one implementation, the instructions 1122 include instructions for a secondary machine module (e.g., module 124 and 126 of FIG. 1) and/or a software library containing methods that call the correlation search module. While the computer-readable storage medium 1128 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "causing", "receiving", "obtaining", "associating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving a request pertaining to a job from a primary machine using a non-persistent connection between the primary machine and a secondary machine;
   transmitting, by the secondary machine using a persistent connection between the primary machine and the secondary machine, a task request for supplemental information pertaining to the job;
   receiving, by the secondary machine, a task response comprising the supplemental information from the primary machine using the persistent connection; and
   transmitting, to the primary machine, a job result for the job using the non-persistent connection, the job result being based on the task response.

2. The method of claim 1, wherein a first data store on the primary machine is synchronized with a second data store on the secondary machine using the supplemental information of the task response.

3. The method of claim 1, wherein data received over the persistent connection comprises a stream of separate task requests in a Java Script Object Notation (JSON) format.

4. The method of claim 1, wherein the persistent connection and the non-persistent connection are Hyper Text Transfer Protocol (HTTP) connections transmitting data in accordance with a Representational State Transfer (REST) architecture, and wherein the persistent connection is a persistent HTTP connection initiated by an HTTP GET call.

5. The method of claim 1, wherein the job pertains to a search query, and the job result is a search result produced using a late-binding schema.

6. The method of claim 1, wherein the primary machine comprises a lookup-table having an entry with translation data that links data identified in the task request to different data, wherein the supplemental information included within the task response comprises the translation data.

7. The method of claim 1, wherein the primary machine includes a data store and the secondary machine includes a secondary data store, wherein the method further comprises synchronizing a portion of the secondary data store with the data store of the primary machine using a one-way pull synchronization implemented using task requests and task responses.

8. The method of claim 1, wherein the secondary machine is prevented from initiating connections with the primary machine, and the primary machine initiates an opening of the persistent connection before initiating an opening of the non-persistent connection, and the persistent connection persists beyond a closing of the non-persistent connection.

9. The method of claim 1, wherein the persistent connection is initiated by the primary machine during a machine setup procedure performed by an administrator and the non-persistent connection is opened after the job has been created from a user request.

10. The method of claim 1, wherein the transmitting the task response comprises:
    opening a third connection with the secondary machine after receiving the task request; transmitting the task response using the third connection; and
    closing the third connection.

11. The method of claim 1, wherein task requests are transmitted over the persistent connection without being transmitted over any other connection.

12. The method of claim 1, wherein the persistent connection is dedicated to receiving task requests from the secondary machine without transmitting task requests or task responses to the secondary machine.

13. The method of claim 1, wherein the secondary machine comprises a plurality of secondary machines and the persistent connection with the secondary machine comprises a plurality of persistent connections, each persistent connection being between the primary machine and one of the plurality of secondary machines, at least one of the plurality of secondary machines having persistent connections with multiple primary machines.

14. The method of claim 1, wherein the job pertains to a search query for searching source data that comprises raw machine data.

15. The method of claim 1, wherein the job pertains to a search query for searching source data that comprises time-stamped events, and wherein each of the time-stamped events includes at least a portion of raw machine data.

16. A system comprising:
    a memory; and
    one or more processing devices coupled to the memory to:
      receive a request pertaining to a job from a primary machine using a non-persistent connection between the primary machine and a secondary machine;

transmit, by the secondary machine using a persistent connection between the primary machine and the secondary machine, a task request for supplemental information pertaining to the job;

receive, by the secondary machine, a task response comprising the supplemental information from the primary machine using the persistent connection; and transmit, to the primary machine, a job result for the job using the non-persistent connection, the job result being based on the task response.

17. The system of claim 16, wherein a portion of a first data store on the primary machine is synchronized with a second data store on the secondary machine using the supplemental information of the task response.

18. The system of claim 16, wherein data received over the first connection comprises a stream of separate task requests in a Java Script Object Notation (JSON) format.

19. The system of claim 16, wherein the persistent connection and the non-persistent connection are Hyper Text Transfer Protocol (HTTP) connections transmitting data in accordance with a Representational State Transfer (REST) architecture, and wherein the persistent connection is a persistent HTTP connection initiated by an HTTP GET call.

20. The system of claim 16, wherein the job pertains to a search query, and the job result is a search result produced using a late-binding schema.

21. The system of claim 16, wherein the primary machine comprises a lookup-table having an entry with translation data that links data identified in the task request to different data, wherein the supplemental information included within the task response comprises the translation data.

22. The system of claim 16, wherein the secondary machine is prevented from initiating connections with the primary machine, and the primary machine initiates an opening of the persistent connection before initiating an opening of the non-persistent connection, and the first connection persists beyond the closing of the non-persistent connection.

23. The system of claim 16, wherein the opening the persistent connection is initiated by the primary machine during a machine setup procedure performed by an administrator and the non-persistent connection is opened after the job has been created from a user request.

24. A non-transitory computer readable storage medium encoding instructions thereon that, in response to execution by a processing device, cause the processing device to perform operations comprising:

receiving a request pertaining to a job from a primary machine using a non-persistent connection between the primary machine and a secondary machine;

transmitting, by the secondary machine using a persistent connection between the primary machine and the secondary machine, a task request for supplemental information pertaining to the job;

receiving, by the secondary machine, a task response comprising the supplemental information from the primary machine using the persistent connection; and transmitting, to the primary machine, a job result for the job using the non-persistent connection, the job result being based on the task response.

25. The non-transitory computer readable storage medium of claim 24, wherein a portion of a first data store on the primary machine is synchronized with a second data store on the secondary machine using the supplemental information of the task response.

26. The non-transitory computer readable storage medium of claim 24, wherein data received over the first connection comprises a stream of separate task requests in a Java Script Object Notation (JSON) format.

27. The non-transitory computer readable storage medium of claim 24, wherein the persistent connection and the non-persistent connection are Hyper Text Transfer Protocol (HTTP) connections transmitting data in accordance with a Representational State Transfer (REST) architecture, and wherein the first connection is a persistent HTTP connection initiated by an HTTP GET call.

28. The non-transitory computer readable storage medium of claim 24, wherein the job pertains to a search query, and the job result is a search result produced using a late-binding schema.

29. The -transitory computer readable storage medium of claim 24, wherein the primary machine comprises a lookup-table having an entry with translation data that links data identified in the task request to different data, wherein the supplemental information included within the task response comprises the translation data.

30. The non-transitory computer readable storage medium of claim 24, wherein the secondary machine is prevented from initiating connections with the primary machine, and the primary machine initiates an opening of the persistent connection before initiating an opening of the non-persistent connection, and the first connection persists beyond the closing of the non-persistent connection.

* * * * *